United States Patent [19]

Miyoshi et al.

[11] 4,299,516
[45] Nov. 10, 1981

[54] METHOD FOR IMPROVING THE STRENGTH OF A WATER-SATURATED SOFT SOIL

[75] Inventors: Hajime Miyoshi, Koganei; Ikuo Okabayashi, Yamato; Etsuo Asanagi, Kashiwa, all of Japan

[73] Assignee: Chiyoda Chemical Engineering & Construction Co., Ltd., Kanagawa, Japan

[21] Appl. No.: 115,491

[22] Filed: Jan. 25, 1980

[30] Foreign Application Priority Data

Jan. 29, 1979 [JP] Japan .................. 54-8915

[51] Int. Cl.³ .................. C09K 17/00; E02D 3/12
[52] U.S. Cl. .................. 405/266; 106/97; 166/292
[58] Field of Search .................. 166/292, 293; 405/258, 405/263, 266; 106/97

[56] References Cited

U.S. PATENT DOCUMENTS

| | | | |
|---|---|---|---|
| 1,748,839 | 2/1930 | Grunewald | 106/97 |
| 2,182,714 | 12/1939 | Witt | 106/97 |
| 2,947,643 | 8/1960 | Kamlet | 106/97 |
| 3,947,284 | 3/1976 | Kitsugi et al. | 106/89 |
| 4,209,335 | 6/1980 | Katayama et al. | 106/89 |

FOREIGN PATENT DOCUMENTS 46-12064  3/1971  Japan .................. 405/263

*Primary Examiner*—Stephen J. Novosad
*Assistant Examiner*—George A. Suchfield
*Attorney, Agent, or Firm*—Birch, Stewart, Kolasch and Birch

[57] ABSTRACT

A water-saturated soft soil is efficiently improved in its strength by incorporating thereinto an additive composed of ingredients A and B; the ingredient A comprises gypsum and the ingredient B comprises a mixture of 40-55% by weight of a Portland cement and 60-45% by weight of a water-granulated iron blast furnace slag having a particle size almost equal to or smaller than that of the Portland cement. The ratio by weight of the ingredient A to the ingredient B ranges from 10/90 to 30/70 and the total amount of the ingredients A and B used for the soft soil is sufficient to strengthen the soft soil.

3 Claims, 2 Drawing Figures

METHOD FOR IMPROVING THE STRENGTH OF A WATER-SATURATED SOFT SOIL

BACKGROUND OF THE INVENTION

This invention relates to an economical method for improving the strength of a water-saturated soft soil.

It is generally known from the past to improve the strength of a water-saturated soft soil deposited on the bottom of seashore, river, lake and lagoon so as to enable passage of people or traffic vehicles and conveyance of construction machines on reclaimed soft grounds formed by dredging such water-saturated soft soil. A method wherein a strengthening agent or solidifying agent is used is known as a method for improving the strength of such water-saturated soft soil. In this method, cement, quick lime, water glass, asphalt and organic macromolecular substances are used as the strengthening agent. However, these strengthening agents are not satisfactory since they are poor in strength-improving effect or are economically unattractive. Especially, in case of a large-scale treatment of such soft soil of a high water content such as a certain kind of sludge or mud called "hedoro" deposited on the bottom of a river or seashore, the amount of such soft soil to be treated in one batch reaches several thousand to several million cubic meters, thus requiring an extremely large amount of the strengthening agent. Hence, the utilizable strengthening agent must be as cheap as possible and must be one capable of remarkably improving the strength in smaller amounts.

In Japanese Unexamined Published Patent Appln. No. 141459/76 there is disclosed a method wherein a mixture of a cement and gypsum is used as a strengthening agent for the soft soil. The strengthening agent disclosed in this reference exhibits an enhanced strength-improving effect to the water-saturated soft soil as compared with a cement alone or a mixture of a cement and quick lime, but is still unsatisfactory in practical use so that a larger amount of the strengthening agent and a longer period of time are required to treat a highly water-saturated soft soil so as to have a practically acceptable strength. This reference suggests the optional use of a water-granulated iron blast furnace slag or fly ash in addition to a cement and gypsum as indispensable ingredients. However, both the water-granulated iron blast furnace slag and the fly ash are not indispensable but optional in this prior art method in view of the proportion defined therein as 0-30%. In this reference, the water-granulated iron blast furnace slag is regarded equivalent in function to the fly ash which is very poor in strength-improving effect and no discussion is made on the properties and technical effects of these optional ingredients. Thus, these ingredients are recognized in this reference only as filler or the like additive for the reduction in the cost of the indispensable strengthening agents. Anyway, this reference fails to teach an effective means for furnishing water-saturated soft soil with satisfactory strength.

BRIEF SUMMARY OF THE INVENTION

It is, therefore, an object of the present invention to provide a method for improving the strength of a water-saturated soft soil economically in high efficiency.

It is another object of the present invention to provide a method for improving the strength of a water-saturated soft soil without increasing the alkalinity thereof and without producing undesirable internal strain thereof.

It is still another object of the present invention to provide a method for improving the strength of a water-saturated soft soil with enhanced workability at a low cost.

Other objects, features and advantages of the present invention will become apparent from the detailed description of the invention which follows, when considered in the light of the accompanying drawings, in which.

DETAILED DESCRIPTION OF THE INVENTION

Figure 1:
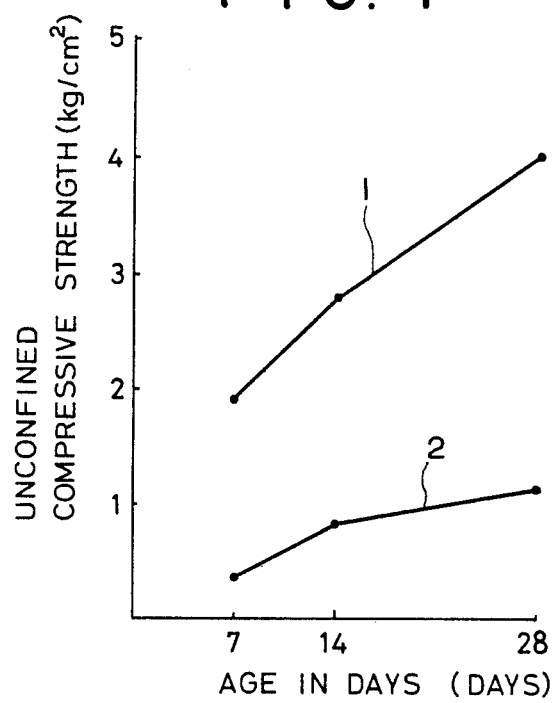
FIG. 1 is a graph showing the influence of the sort of water-granulated iron blast furnace slag in the ingredient B on the increase in strength of a water-saturated soft soil when a combination of the ingredients A and B is used for treating the soft soil.

The present invention provides a method for improving the strength of a water-saturated soft soil which comprises admixing the soft soil with an additive comprising the ingredients A and B. The ingredients A and B can react effectively with soil components of the soft soil and are indispensable for improving its strength.

The additive used in the present invention is comprised of the following ingredients:

Ingredient A: gypsum ($CaSO_4.2H_2O$)
Ingredient B: a mixture of 40-55% by weight of a Portland cement and 60-45% by weight of a water-granulated iron blast furnace slag.

Any gypsum can be used as the ingredient A so far as it is in the form of powder or granule. The term "gypsum" is used herein to mean calcium sulfate dihydrate exclusively. No limitation is set for the particle size of the gypsum. Accordingly, gypsum formed as by-product in a process for the desulfurization of flue gas can advantageously be used as such for the present invention.

Utilizable as the Portland cement in the ingredient B is an Ordinary Portland cement satisfying the specifications defined in JIS R-5210 for "Portland cements". According to the nature of a water-saturated soft soil and the treatment conditions, the Ordinary Portland cement may be used alone or as a mixture with a moderate heat Portland cement, a high early strength Portland cement and/or a ultrahigh early strength Portland cement.

The water-granulated iron blast furnace slag used together with the Portland cement in the ingredient B is prepared from a by-product produced in an iron blast furnace by rapidly cooling the slag with water to form divided sand-like granules of the slag having a particle size of 1-5 mm and then finely dividing the granules to have a particle diameter of 100-1μ (referred to hereinafter as the water-granulated iron blast furnace slag). The composition of the water-granulated iron blast furnace slag varies according to the composition of iron ores used or the operation conditions of the blast furnace but is generally as follows:

$SiO_2$ 30-35%, $Al_2O_3$ 13-18%, CaO 38-45%, $Fe_2O_3$ 0.5-1.0% MgO 3-6%, S 0.5-1.0%, MnO 0.5-1.5% and $TiO_2$ 0.5-1.0%.

The water-granulated iron blast furnace slag to be mixed with the Portland cement to form the ingredient B is pulverized to have a specific surface area of at least 2000 cm$^2$/g (particle diameter of not greater than 10$\mu$) preferably 3600 cm$^2$/g (particle diameter of not greater than 5$\mu$) when measured according to the Blaine's air permeability method (JIS R-5201). Thus, the particle diameter of the water-granulated iron blast furnace slag is almost equal to or smaller than that of the Portland cement defined in JIS R-5210 wherein Ordinary Portland cement is defined to have a specific surface area of at least 2500 cm$^2$/g. If the particle size becomes excessively large, the reactivity of the slag will become seriously poor to give an undesirable result. When the finely pulverized water-granulated iron blast furnace slag having a particle size almost equal to the Portland cement is used in the present invention, the treated soft soil is 3-4 times stronger than the soft soil treated with the additive including ordinary water-granulated iron blast furnace slag of coarse grains. It is important that the water-granulated iron blast furnace slag be previously mixed homogeneously with the Portland cement for promoting its reactivity. The proportion of the Portland cement in the ingredient B is maintained within the range of 40-55% by weight (the balance being essentially the slag). If the proportion of the cement is less than 40% by weight, the strength-improving effect on a highly water-saturated soft soil will be reduced. On the other hand, if the proportion of the cement exceeds 55% by weight, a significant amount of heat will be evolved during the strength-improving treatment, thus resulting in the formation of internal strain in the treated soft soil. In addition, the use of an excess amount of the cement results in a higher content of calcium hydroxide in the treated soft soil. This is undesirable because the treated soft soil is strong in alkalinity and is susceptible to erosion with sewer or sea water. A preferable proportion of the materials in the ingredient B is 50% by weight of the Portland cement and 50% by weight of the water-granulated iron blast furnace slag.

A water-saturated soft soil is first admixed with the ingredient A so that the soft soil may be made reactive with the ingredient B to be added subsequently. In this case, the ingredient A is dispersed into the soft soil and dissolved in or wetted with the soft soil whereby the soft soil is converted into a preferable reaction culture medium for the ingredient B. Since the amount of the ingredient A added is small and since the ingredient A exhibits no increase in viscosity unlike the case of the ingredient B, the mixing of the soft soil with the ingredient A is performed homogeneously without difficulty.

The water-saturated soft soil thus enhanced in reactivity is then admixed with the ingredient B. By adding the ingredient B to the admixture of the soft soil and the ingredient A, various reactions for improving the strength of the water-saturated soft soil including the reaction between the ingredients A and B, the hydration reaction of the ingredient B and the reaction between the soft soil and the ingredients A and B take place. These reactions for improving the strength of the water-saturated soft soil proceed in an extremely high efficiency since the soft soil to which the ingredient A has been added is converted into a preferable reaction culture medium for the ingredient B.

In the treatment of the water-saturated soft soil for improving the strength thereof, a reaction for the formation of ettringite (3CaO.Al$_2$O$_3$.3CaSO$_4$.32H$_2$O) takes place between the soft soil and the ingredients A and B. As the water-saturated soft soil has homogeneously be admixed with the ingredient A in the primary admixing treatment, the reaction for the formation of ettringite takes place smoothly allover the treated soft soil by addition of the ingredient B whereby rapid improvement in strength of the soft soil is attained.

In the present invention it is of particular advantage that the water-granulated iron blast furnace slag used as one component of the ingredient B has finely been pulverized to have a particle size almost equal to or smaller than the Portland cement used as the other component and is previously mixed homogeneously with the cement before use. When the soft soil subjected to the primary admixing treatment is admixed with the ingredient B, therefore, the water-granulated iron blast furnace slag is readily stimulated with slaked lime formed by the hydration reaction of the Portland cement to promote the reaction for forming ettringite whereby improvement in strength of the treated soft soil is accelerated. To say it in another way, the water-granulated iron blast furnace slag itself shows no hydraulic property, unlike the cement, but begins to show hydraulic property when brought into contact with a stimulating agent such as slaked lime. In case of the method of this invention wherein the water-granulated iron blast furnace slag is finely pulverized to become reactive and is previously mixed homogeneously with the Portland cement so as to receive stimulation with slaked lime formed by the hydration reaction of the cement, the water-granulated iron blast furnace slag shows the same hydraulic property as shown by the cement.

In the method of this invention, the Pozzolan reaction between calcium ion and silicate ion also takes place, in addition to the reaction for the formation of ettringite, as a reaction for improving the strength of the water-saturated soft soil. As the water-granulated iron blast furnace slag used in the present invention is in a finely pulverized form, it serves as a reactant also for this Pozzolan reaction.

Anyway, the water-granulated iron blast furnace slag per se is considered in this invention to participate efficiently in the reactions for improving the strength of the water-saturated soft soil and apparently contributes efficient promotion of more complicated chemical reactions whereby improvement in strength of the soft soil is rapidly achieved, in contrast to the prior art methods utilizing mainly the hydration reaction of a cement.

In order to attain rapid improvement in strength of the water-saturated soft soil, it is important to specify the proportion of the ingredient A to the ingredient B. In the method of this invention, this proportion is so selected that the ratio by weight of the ingredient A calculated as gypsum to the ingredient B calculated as a mixture of the Portland cement and the water-granulated iron blast furnace slag is within the range from 10/90 to 30/70. If the ratio by weight of the ingredient A to the ingredient B is outside this range, the technical merit achieved by the addition of the ingredients A and B will be reduced.

For improving the strength of a water-saturated soft soil, it is desirable that the soft soil be admixed first with the ingredient A and then with the ingredient B as described hereinbefore. In some cases, the soft soil may be admixed with the ingredients A and B at the same time. However, admixing of the water-saturated soft soil first with the ingredient B and then with the ingredient A is extremely disadvantageous in that the admixture is poor in workability and in attaining improvement in strength of the soft soil, and so cannot be said to be a practical method. The ingredients A and B can be used each in a powdery or slurried form in the method of this invention.

According to the method of this invention, the reactions between the soft soil and the ingredients A and B are promoted in an extremely highly efficient manner unlike the case of the prior art methods so that the maximal strength-improving effect is expected to the soft soil. Thus, small amounts of the ingredients A and B are sufficient enough for achieving the desired strength. Moreover, the time required for achieving the desired strength is shortened. In general, the strength required for the treated soft soil in the field is about 0.5-2 kg/cm$^2$ in terms of unconfined compressive strength. This can be achieved according to the present invention by admixing the soft soil with the ingredients A (calculated as gypsum) and B (calculated as a mixture of a Portland cement and a water-granulated iron blast furnace slag) in a total amount of about 50-150 kg per cubit meter of the soft soil. In case the soft soil contains a large amount of organic materials and emits strong bad odors, it is desirable to increase the total amount of the ingredients A and B in comparison with the case where the soft soil contains no or a little organic materials. When the soft soil has a low content of organic materials, a total amount of the ingredients A and B within the range of 50-100 kg per cubic meter of the soft soil is sufficient to furnish it with a satisfactory strength.

The method of the present invention is not influenced by the water content of the water-saturated soft soil and is applicable to a water-saturated soft soil having a water content of 50-200% and even to a highly water-saturated soft soil having a water content as high as 500-1000%. In case the method of this invention is applied to a highly water-saturated soft soil, excess water will be separated from the treated soft soil and go up on the surface thereof.

According to the method of the present invention wherein the amount of the Portland cement used as one of the components of the ingredient B is relatively small, the generation of heat resulting from the hydration reaction of the cement is remarkably inhibited so that the formation of strain in the treated soft soil is prevented effectively. Moreover, the quantity of residual alkali in the treated soft soil is small so that no increase in alkali concentration is found in the treated soft soil. Further, no fear of erosion with sewer or sea water exists in the treated soft soil. The present invention is economically very advantageous in that the total amount of the ingredients is small and the amount of the Portland cement is decreased with increase in the amount of the water-granulated iron blast furnace slag.

The method above described wherein the ingredients A and B are used effectively for improving the strength of the soft soil is advantageously applied not only for improving the strength of reclaimed soft grounds but also for improving the nature of soft soil or sludge deposited on the bottom of sea, river and the like. Since the method of this invention is also effective to some extent in deodorization, this method may be applied to a weak water-saturated soft soil having bad odors for strengthening and deodorizing the soft soil.

The present invention will now be illustrated in more detail by way of the examples. In Examples 1-3, powdery gypsum (average particle diameter: 53μ, water content: 9%, composition: CaO 31.2% and SO$_3$ 44.1%) produced as a by-product in the desulfurization treatment of waste gas was used as the ingredient A, and a homogeneous mixture of (X) Ordinary Portland cement (specific surface area: 2500 cm$^2$/g measured according to the Blaine's air permeability method) and (Y) a water-granulated iron blast furnace slag (specific surface area: 3600 cm$^2$/g measured according to the Blaine's air permeability method, composition: SiO$_2$ 33.5%, Al$_2$O$_3$ 15.7%, CaO 42.5% and Fe$_2$O$_3$ 0.7%, a vitreous substance free from crystalline substances as a result of an X-ray diffraction test) was used as the ingredient B. In Examples 1-3, a muddy marine deposit having a water content of 260% (particle size distribution: 0-20μ 72%, 20-50μ 17% and 50-150μ 10%, an average particle diameter: 7μ) and a density of 1.20 g/cm$^3$ at a water content of 260% was used as a water-saturated soft soil to be treated.

EXAMPLE 1

To 1 m$^3$ of the soft soil was added 20 kg of the ingredient A and the mixture was homogeneously mixed in a kneader. To the mixture was then added 80 kg of the ingredient B (X/Y=50/50) and the whole was thoroughly mixed in the kneader. A sample of the mixture was then injected into a cylindrical mold of 50 mm in inside diameter and 100 mm in height, maintained at 20° C. in a constant temperature and humidity box for a given period of time to effect curing the sample, and then released from the mold for the measurement of its unconfined compressive strength.

For the purpose of comparison, a similar test was performed except that a water-saturated iron blast furnace slag in the form of coarse granules (Y') was used.

A result of these tests is shown in Table 2 and as a graph in FIG. 1. A particle size distribution of the water-granulated iron blast furnace slags Y and Y' used is shown in Table 1.

TABLE 1

| Sort of the water-granulated iron blast furnace slags | Passing weight (%) Size of sieves (mm) | | | | | | | | |
|---|---|---|---|---|---|---|---|---|---|
| | 0.01 | 0.03 | 0.088 | 0.15 | 0.3 | 0.6 | 1.2 | 2.5 | 5 |
| Y | 40.5 | 84.0 | 100 | — | — | — | — | — | — |
| Y' | | | | 5.0 | 17.5 | 40.0 | 60.5 | 87.0 | 99.5 |

TABLE 2

| Examples | Unconfined compressive strength (kg/cm$^2$) Age in days | | |
|---|---|---|---|
| | 7 | 14 | 28 |
| The present invention | 1.9 | 2.8 | 4.0 |
| Comparative Example | 0.4 | 0.8 | 1.1 |

In a graph of FIG. 1, the abscissa stands for the age in days after the treatment and the ordinate for the unconfined compressive strength of the treated soft soil (kg/cm$^2$). A broken line 1 stands for a result of Example of the present invention while a broken line 2 for a result of the Comparative Example.

EXAMPLE 2

A test was performed in the same manner as described in Example 1 except that the proportion of the ingredient A to the ingredient B was varied. A result of the test is shown in FIG. 2.

Figure 2:
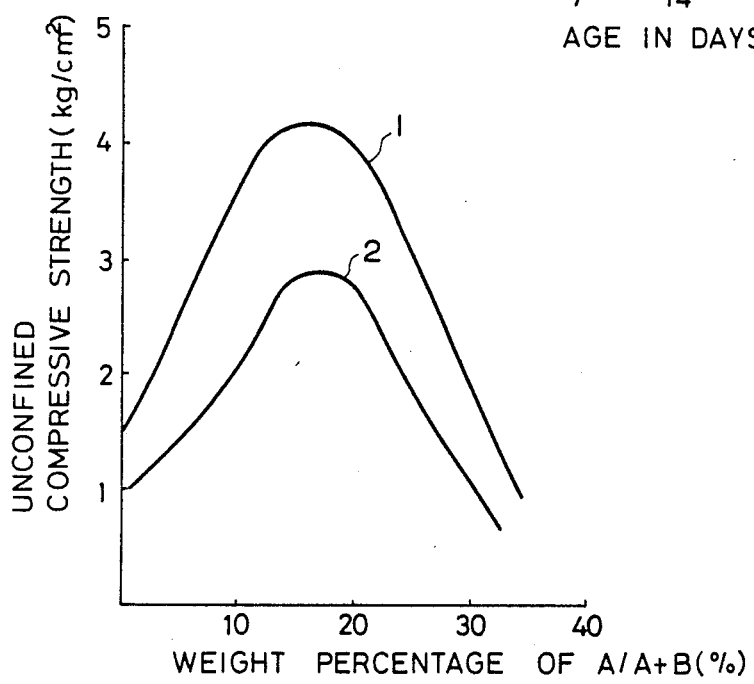
FIG. 2 is a graph showing the influence of the proportion of the ingredient A to the ingredients A and B in the additive on the increase in strength of the treated soft soil.

In a graph of FIG. 2, the abscissa stands for the percent ratio by weight of the ingredient A to the ingredients A and B ($A/A+B \times 100$) while the ordinate for the unconfined compressive strength of the treated soft soil. In this graph, curves 1 and 2 show results obtained for the treated soft soil 4 weeks and 2 weeks after the treatment, respectively.

EXAMPLE 3

A test was performed in the same manner as described in Example 1 except that the method of adding the ingredients A and B to the soft soil used in Example 1 was modified.

For the purpose of comparison, a test was also performed in such manner that the ingredient B was first added to the soft soil and then the ingredient A was added thereto.

TABLE 3

| Test | Order of addition of the ingredients (first) | (second) | Workability | Cost for work | Comparison in strength |
|---|---|---|---|---|---|
| I | A | B | Good | Small | 100 |
| II | A and B at the same time | | Generally good | Medium | 98 |
| III | B | A | Bad | Great | 87 |

As many apparently widely different embodiments of this invention may be made without departing from the spirit and scope thereof, it is to be construed that this invention is not limited to the specific embodiments illustrated in the examples except as defined in the appended claims.

What is claimed is:

1. A method for improving the strength of a water-saturated soft soil, which comprises admixing the soft soil with an ingredient A comprising gypsum and an ingredient B comprising a mixture of 40-50% by weight of a Portland cement and 60-45% by weight of a water-granulated iron blast furnace slag, the slag having a particle size almost the same as or less than that of the cement, the ratio by weight of the ingredient A to the ingredient B being within the range from 10/90 to 30/70, the soft soil first being admixed with the ingredient A so that the soft soil may be made reactive with the ingredient B which is subsequently added to the admixture of the soft soil and the ingredient A.

2. A method according to claim 1, wherein the total amount of the ingredients A and B is 50-150 kg per cubic meter of the soft soil.

3. A method according to claim 1, wherein the Portland cement is Ordinary Portland cement.

* * * * *

UNITED STATES PATENT AND TRADEMARK OFFICE
CERTIFICATE OF CORRECTION

PATENT NO. : 4,299,516
DATED : November 10, 1981
INVENTOR(S) : Miyoshi et al

It is certified that error appears in the above—identified patent and that said Letters Patent is hereby corrected as shown below:

Claim 1

Line 4, change "40-50%" to -- 40-55% --

Signed and Sealed this

Twentieth Day of July 1982

[SEAL]

Attest:

GERALD J. MOSSINGHOFF

Attesting Officer     Commissioner of Patents and Trademarks